United States Patent
Song

(10) Patent No.: US 11,740,761 B2
(45) Date of Patent: Aug. 29, 2023

(54) METHOD FOR DISPLAYING ICONS, TERMINAL AND NON-TRANSITORY STORAGE MEDIUM

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/733,648

(22) Filed: Apr. 29, 2022

(65) Prior Publication Data
US 2022/0269394 A1    Aug. 25, 2022

Related U.S. Application Data

(63) Continuation-in-part of application No. 17/079,366, filed on Oct. 23, 2020, now Pat. No. 11,354,021.
(Continued)

(30) Foreign Application Priority Data

Jun. 8, 2018 (CN) .......................... 201810590196.2

(51) Int. Cl.
*G06F 3/04817* (2022.01)
*G06F 3/0485* (2022.01)
(Continued)

(52) U.S. Cl.
CPC ........ *G06F 3/04817* (2013.01); *G06F 3/0482* (2013.01); *G06F 3/0485* (2013.01); *G06F 3/04845* (2013.01); *G06F 3/04883* (2013.01)

(58) Field of Classification Search
CPC .............. G06F 3/04817; G06F 3/0482; G06F 3/04883; G06F 3/04845
See application file for complete search history.

(56) References Cited

U.S. PATENT DOCUMENTS

| 6,538,635 B1 | 3/2003 | Ringot |
| 2004/0100479 A1* | 5/2004 | Nakano ................. G06F 3/0485 715/700 |

(Continued)

FOREIGN PATENT DOCUMENTS

| CN | 101552837 | 10/2009 |
| CN | 102402375 | 4/2012 |

(Continued)

OTHER PUBLICATIONS

CNIPA, First Office Action for CN Application No. 201810590196.2, dated Feb. 3, 2020.
(Continued)

*Primary Examiner* — Mong-Shune Chung
(74) *Attorney, Agent, or Firm* — Hodgson Russ LLP

(57) ABSTRACT

The embodiments of the disclosure disclose a method for displaying icons, a terminal, and a non-transitory storage medium. In the method, Q first function icons are displayed along an arc in a first target display region adjacent to an edge of the display screen of the terminal, where the Q first function icons are selected from P function icons, the Q first function icons include L locked function icons and (Q−L) replaceable function icons, Q is a preset positive integer, P is an integer greater than Q, and L is an integer smaller than Q.

20 Claims, 14 Drawing Sheets

Related U.S. Application Data which is a continuation-in-part of application No. PCT/CN2019/087654, filed on May 20, 2019.

(51) Int. Cl.
*G06F 3/0482* (2013.01)
*G06F 3/04845* (2022.01)
*G06F 3/04883* (2022.01)

(56) References Cited

U.S. PATENT DOCUMENTS

| | | | |
|---|---|---|---|
| 2012/0036434 A1* | 2/2012 | Oberstein | G06F 3/0482 715/702 |
| 2013/0019182 A1* | 1/2013 | Gil | G06F 3/0482 715/834 |
| 2013/0145316 A1* | 6/2013 | Heo | G06F 3/04817 715/810 |
| 2014/0325443 A1* | 10/2014 | Kim | G06F 3/0482 715/825 |
| 2015/0227308 A1 | 8/2015 | Kim et al. | |
| 2016/0364089 A1 | 12/2016 | Blackman et al. | |
| 2017/0147160 A1 | 5/2017 | Snyder et al. | |
| 2017/0168677 A1 | 6/2017 | Smits | |
| 2017/0192627 A1* | 7/2017 | Agnoli | G06F 3/04847 |
| 2018/0121047 A1 | 5/2018 | Goel et al. | |

FOREIGN PATENT DOCUMENTS

| | | |
|---|---|---|
| CN | 103677530 | 3/2014 |
| CN | 103744582 | 4/2014 |
| CN | 103838472 | 6/2014 |
| CN | 104636024 | 5/2015 |
| CN | 105511723 | 4/2016 |
| CN | 105528141 | 4/2016 |
| CN | 105912190 | 8/2016 |
| CN | 106354403 | 1/2017 |
| CN | 106843739 | 6/2017 |
| CN | 107329647 | 11/2017 |
| CN | 107688422 | 2/2018 |
| CN | 108021306 | 5/2018 |
| CN | 108089786 | 5/2018 |
| CN | 108803965 | 11/2018 |
| WO | 2017109504 | 6/2017 |

OTHER PUBLICATIONS

CNIPA, Second Office Action for CN Application No. 201810590196.2, dated Jun. 29, 2020.
WIPO, International Search Report for PCT/CN2019/087654, dated Aug. 23, 2019.
CNIPA, Notification to Grant Patent Right for Invention for CN Application No. 201810590196.2, dated Nov. 3, 2020.
EPO, Extended European Search Report for EP Application No. 19815186.2, dated Jul. 9, 2021.
IPI, Office Action for IN Application No. 202017056889, dated Jan. 4, 2022.

* cited by examiner

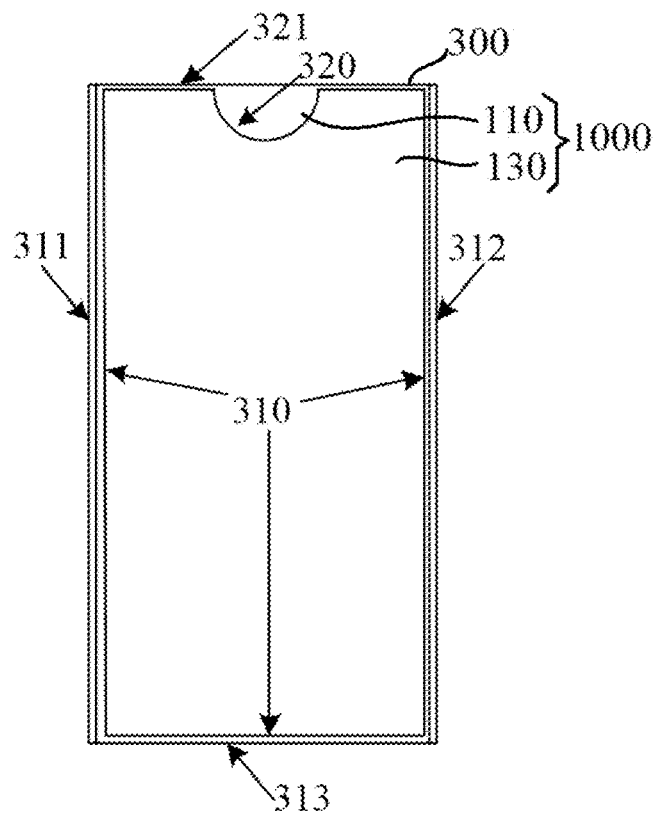

FIG. 20

```
┌─────────────────────────────────────────────────────────────┐  2010
│  A first target region in the display portion is determined │
└─────────────────────────────────────────────────────────────┘
                              │
                              ▼
┌─────────────────────────────────────────────────────────────┐  2020
│  A plurality of first function icons are displayed in the    │
│  first target region along an extending direction of the    │
│  first target region                                        │
└─────────────────────────────────────────────────────────────┘
                              │
                              ▼
┌─────────────────────────────────────────────────────────────┐  2030
│  A plurality of second function icons is displayed          │
│  in the display portion when an icon display                │
│  instruction applied to the first target region is detected │
└─────────────────────────────────────────────────────────────┘
```

FIG. 21

METHOD FOR DISPLAYING ICONS, TERMINAL AND NON-TRANSITORY STORAGE MEDIUM

CROSS REFERENCE TO RELATED APPLICATION(S)

This application is a continuation-in-part of U.S. application Ser. No. 17/079,366, filed Oct. 23, 2020, which is a continuation-in-part of International Application No. PCT/CN2019/087654, filed May 20, 2019, which claims priority to Chinese Patent Application No. 201810590196.2, filed Jun. 8, 2018. The entire disclosures of the aforementioned applications are incorporated herein by reference.

TECHNIQUE FIELD

The present disclosure relates to the field of computer technologies, and more particularly, to a method for displaying icons, a terminal, and a non-transitory storage medium.

BACKGROUND

Mobile terminals may implement various functions with different applications.

In the related art, when a user needs to use a specified application in a mobile terminal, the user may search for an activation icon of the specified application on the desktop of the mobile terminal, and the specified application may be activated when the activation icon is clicked.

SUMMARY

The embodiments of the present disclosure provide a method for displaying icons, a terminal, and a non-transitory storage medium, as follows:

In an aspect, a method for displaying icons is provided. The method is implemented by a terminal. In the method, Q first function icons are displayed along an arc in a first target region of a display screen of the terminal, where the first target region is a display region adjacent to an edge of the display screen, the Q first function icons are selected from P function icons, the Q first function icons include L locked function icons and (Q–L) replaceable function icons, Q is a preset positive integer, P is an integer greater than Q, and L is an integer smaller than Q.

In another aspect, a terminal is provided. The terminal includes a processor and a memory. The memory stores instructions which are executed by the processor to perform a method for displaying icons. The method includes operations as follows. A first target display region adjacent to an edge of the display screen of the terminal is determined. Q first function icons are displayed along an arc in the first target display region, where the Q first function icons include L locked function icons and (Q–L) replaceable function icons, where Q is a preset positive integer, and L is an integer smaller than Q.

In yet another aspect, a non-transitory storage medium is provided. The storage medium stores instructions which are executed by a processor to perform the above method for displaying icons.

BRIEF DESCRIPTION OF THE DRAWINGS

The above and/or additional aspects and advantages of the present disclosure will become apparent and easily understood from the description of the embodiments in conjunction with the following drawings, in which:

FIG. 20 illustrates still another terminal, in accordance with an embodiment of the present disclosure.

FIG. 21 illustrates still another method for displaying icons, in accordance with an embodiment of the present disclosure.

DETAILED DESCRIPTION OF PREFERRED EMBODIMENTS

Figure 1:
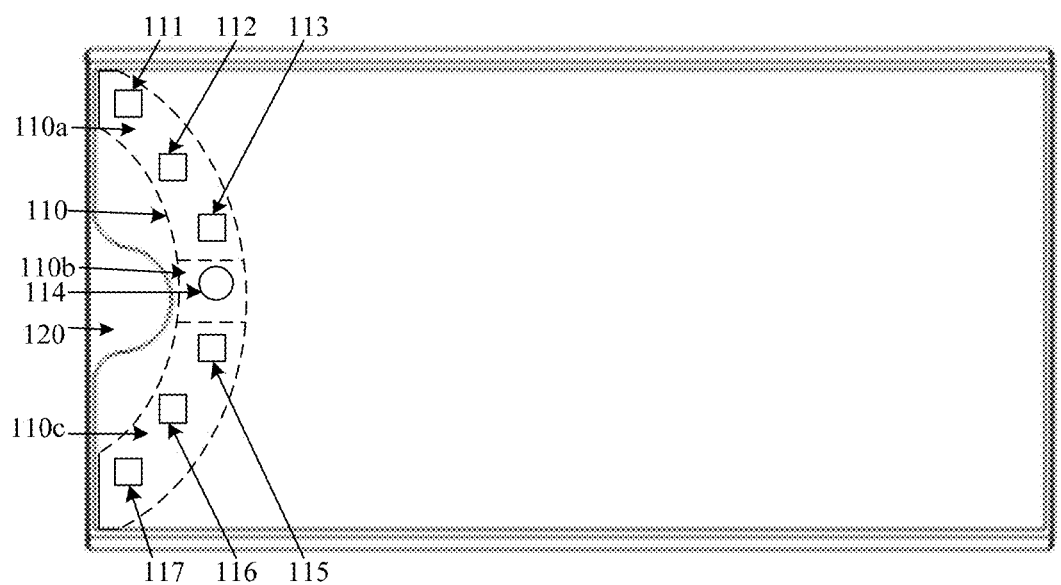
FIG. 1 illustrates a schematic view of a display mode of a first arc-shaped display region, in accordance with an embodiment of present disclosure.

In order to facilitate the understanding of the present disclosure, the present disclosure will be described more fully hereinafter with reference to the accompanying drawings. Several embodiments of the present disclosure are presented in the drawings. However, the disclosure may be embodied in many different forms and is not limited to the embodiments described herein. Rather, these embodiments are provided so that this disclosure will be thorough and comprehensive.

In the technical solution of prior art, when there are a large number of activation icons for activate applications on the desktop of a mobile terminal, an operation for the user to find an activation icon of a specified application is relatively complex. Moreover, when it needs to activate a specified application via the terminal in urgency, the specified application cannot be quickly activated because of the complex operation.

When any of methods provided by the embodiments of the present disclosure is executed, it can be implemented by a terminal with a special-shaped screen. The special-shaped screen defines a special-shaped notch region. It should be noted that the embodiments of the disclosure are illustrated by taking a terminal with a special-shaped screen as an example, but the embodiments of the disclosure are not limited thereto; in particular, the solutions of the embodiments of the disclosure are also applicable to a terminal with any type of display screen. The terminal is configured to determine Q first function icons and P to Q second function icons among P function icons, where Q is a positive integer in a preset value, and P is an integer greater than Q. The Q first function icons are displayed in an arc arrangement in a target region, and the target region is a display region that is attached to an edge of the display screen or surrounds the special-shaped notch region. When an icon display instruction applied to the target region is detected, K second function icons are displayed in a current user interface, and K is an integer not greater than (P−Q). It should be noted that, the terms (P−Q) in the description is a value of the difference between P and Q, that is, (P−Q) is P minus Q. Because this method is implemented by the terminal with the display screen, when there are many function icons displayed on the edge of the terminal screen in the arc arrangement, the terminal can display the originally hidden function icons in the user interface for reposing to the action of the icon display instruction, which enables the user to activate the specified application through the function icon. Operations for searching for the icon of the specified application may be simplified, a speed at which the terminal displays the function icon of the specified application may be increased, and an efficiency of activating the specified application is therefore improved.

In order to facilitate the understanding of the solutions illustrated in the embodiments of the present disclosure, several terms appearing in the embodiments of the present disclosure will be introduced below.

A first target region refers to a display region that attached to the edge of the display screen or surrounds the special-shaped notch region in the special-shaped screen. In particular, since the special-shaped notch region is generally located at an edge (such as a top edge) of the special-shaped screen, the first target region surrounding the special-shaped notch region of the special-shaped screen is also located at an edge of the display screen. In a possible implementation, the first target region may be transparent in a display layer. In another possible implementation, the first target region may also be colored in the display layer. Alternatively, the icon display instruction may be applied on the first target region. In a possible implementation, the first target region may be first arc-shaped. In another possible implementation, the first target region may also be a rectangular region. In other possible implementation, the first target region may also be a region in other shapes, which is not limited in the embodiments of the present disclosure. It should be noted that, for the sake of understanding, the following takes the target region being the first arc-shaped as an example.

A first arc-shaped display bar refers to a display region being arc-shaped in the display screen. The first arc-shaped display bar is configured to display function icons. For example, an icon of application A is displayed in the first arc-shaped display bar, and the icon of application A is a function icon.

The first arc-shaped bar is an arc-shaped display region located at any of the edges of the display screen or surrounding the special-shaped notch region of the special-shaped screen.

As illustrated in FIG. 1, FIG. 1 illustrates a schematic view of a display mode of the first arc-shaped bar, in accordance with an embodiment of present disclosure. The first arc-shaped display bar 110 is displayed around the special-shaped notch region 120. Icons of first applications are displayed in the first arc-shaped display bar 110. The icons of the first applications may include at least one of a function icon 111, a function icon 112, a function icon 113, a function icon 114, a function icon 115, a function icon 116, and a function icon 117.

Alternatively, there may be one or at least two first arc-shaped display bar 110. The number of the first arc-shaped display bar is not limited in the embodiments of the present disclosure.

Alternatively, the first arc-shaped display bar 110 may be divided into several sub-regions. Each one of the sub-regions can be individually displayed in the user interface in response to a corresponding trigger gesture. The following possible implementations may illustrate the details.

Figures 2, 3:
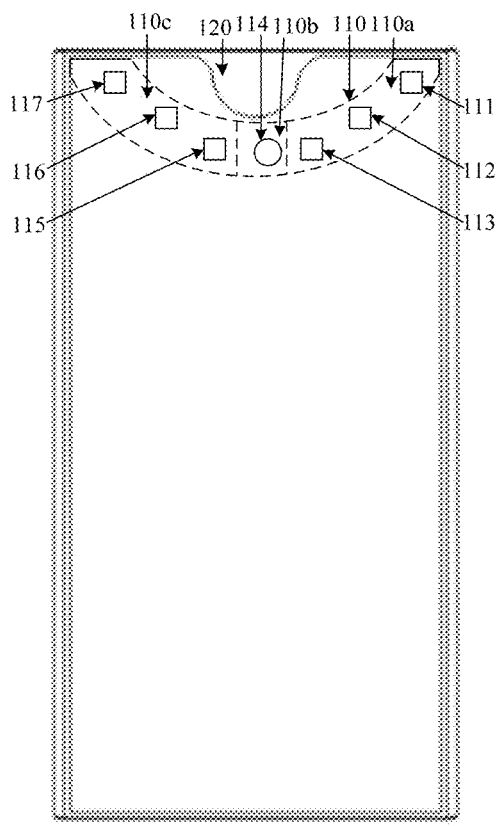
FIG. 2 illustrates a schematic view of another display mode of the first arc-shaped display region, in accordance with an embodiment of present disclosure.
FIG. 3 to FIG. 7 illustrate schematic views of five possible forms of a special-shaped screen, in accordance with an embodiment of present disclosure.

In a possible implementation, see FIG. 2, the first arc-shaped display bar 110 may be divided into three sub-regions including a first sub-region 110*a*, a second sub-region 110*b*, and a third sub-region 110*c*. The function icon 111, the function icon 112, and the function icon 113 are displayed in the first sub-region 110*a*. The function icon 114 is displayed in the second sub-region 110*b*. The function icon 115, the function icon 116, and the function icon 117 are displayed in the third sub-region 110*c*.

Alternatively, the first arc-shaped display bar may be triggered when the terminal is in a horizontal display state, or when the terminal is in a vertical display state. For example, as illustrated in FIG. 1, the first arc-shaped display bar may be triggered to display on the special-shaped screen when the terminal is in a horizontal display state. As illustrated in FIG. 2, FIG. 2 illustrates a schematic view of another display mode of the first arc-shaped display region, in accordance with an embodiment of present disclosure. In FIG. 2, the first arc-shaped bar is triggered to display when the terminal is in the vertical display state.

A Function icon refers to a virtual icon displayed in the first arc-shaped display bar. Alternatively, the function icon may be an activation icon of an in-system application or a third-party application. Alternatively, the function icon may also be an activation icon of a system service or a system process.

Alternatively, when the function icon is the activation icon of an in-system application, the in-system application may include at least one in-system application selected from a group consisting of an address book application, a short message application, a phone application, a weather application, a date application, a clock application, a camera application, a gallery application, a browser application, a calculator application, a voice recorder application, a compass application, a flashlight application, a file management application, an application management application, and a setting application.

Alternatively, when the function icon is the activation icon of a third-party application, the third-party application may include at least one third-party application selected from a group consisting of a game application, a social chat application, a browser application, a book reading application, a music application, a video application, a live broadcast application, a short video application, a shopping application, payment and wealth management applications, an image beautification application, a smart device management application, a weather application, a map navigation application, a text editing application, a shared transportation application, a takeaway application, a ticket booking application, a taxi application, an attendance check-in application, a recruitment application, a resource download application, an email application, a news information application, and a scanning code application.

Alternatively, when the function icon is the activation icon of a system service or the activation icon of a system process, the system service may include at least one system service selected from a group consisting of a wireless LAN switching on/off service, a Bluetooth function switching on/off service, a mobile data function switching on/off service, a ring mode switching service, an automatic rotation service for witching the horizontal and vertical display stated, a flight mode switching on/off service, a location information switching on/off service, a screen recording service, an eye protection mode switching on/off service, an screenshot service, a Do Not Disturb (DND) switching on/off service, a power saving mode switching on/off service, and an Near Field Communication (NFC) switching on/off services.

A function icon refers to a specified function icon that is required to be displayed in the first target region or the second target region. The first target region may be implemented as the first arc-shaped display bar, and the second target region can be implemented as a second arc-shaped display bar. Alternatively, there may be P function icons, and P is a positive integer.

A first function icon refers to a function icon displayed in the first arc-shaped display bar when the first arc-shaped display bar is displayed, for responding to an initially trigger, as an initially display. Alternatively, there may be Q the first function icons, and Q is a positive integer, and P is greater than Q.

In a possible implementation, the initially display may refer to a first time for the first arc-shaped display bar to display when the terminal executes a specified instruction. For example, the initially display may be a first time for the first arc-shaped display bar to display after the mobile terminal is powered on, or it may be the first time for the first arc-shaped display bar to display after the mobile terminal is unlocked.

In another possible implementation, the initial display may be a first time for the first arc-shaped display bar to display in a period determined by the mobile terminal. For example, when the period lasts for one day, the initial display may be the first time for the first arc-shaped display bar to display in each day. For another example, when the period lasts for three days, the initial display may be the first time for the first arc-shaped display bar to display every three days.

A second function icon refers to the function icon that is not displayed when the first arc-shaped display bar is in the initial display. That is, second function icons may refer to the icons, excepting the first function icon, among all of the function icons. Alternatively, when the number of function icons is P and the number of first function icons is Q, the number of second function icons is equal to (P−Q).

In a possible scenario, when the first arc-shaped display bar can display 7 function icons at one time when expanded, and when there are 15 function icons, the value of P is 15, and the value of Q is 7. P minus Q, i.e., (P−Q), is 8. That is, the number of the first function icons is 7, and the number of the second function icons is 8.

An icon display instruction refers to a computer program instruction that is applied to the target region and is configured to instruct the terminal to display K second function icons. Alternatively, the icon display instruction is an instruction generated by the terminal when the terminal receives a specified operation applied by the user. In a possible implementation, there may be K second function icons and Q first function icons displaying on the screen simultaneously. In another possible implementation, the K first function icons of the Q first function icons may be hidden by the terminal when the K second function icons are displayed.

An expanded display instruction is one of the icon display instructions, and is configured to instruct the terminal to display K second function icons and Q first function icons simultaneously in one user interface.

A replacement instruction is one of the icon display instructions, and is configured to instruct the terminal to replace K first function icons of the Q first function icons with K second function icons, and display the K second function icons.

Exemplarily, the method for displaying icons provided in the embodiments of the present disclosure can be implemented by a terminal including a special-shaped screen. It should be noted that this method for displaying icons can also be applied to terminals with a screen such as a full-screen, a foldable screen, a doubled screen, a curved surface screen, or a flexible screen, which is mot limited in embodiments of the present disclosure.

Figure 4:
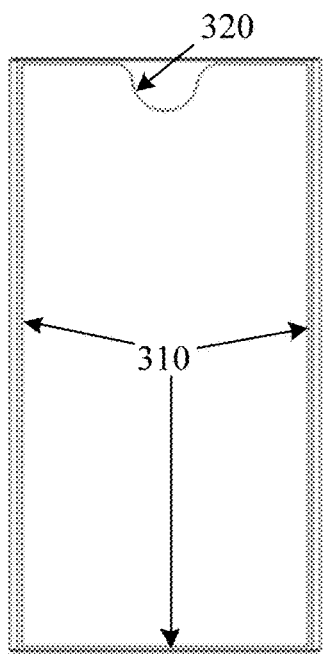
Figure 5:
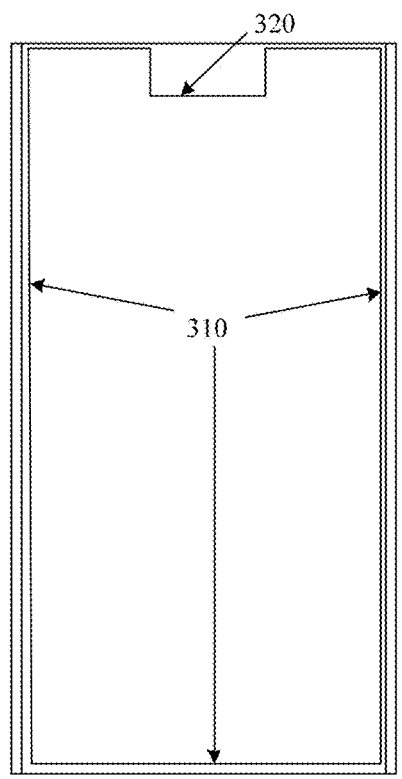
Figure 6:
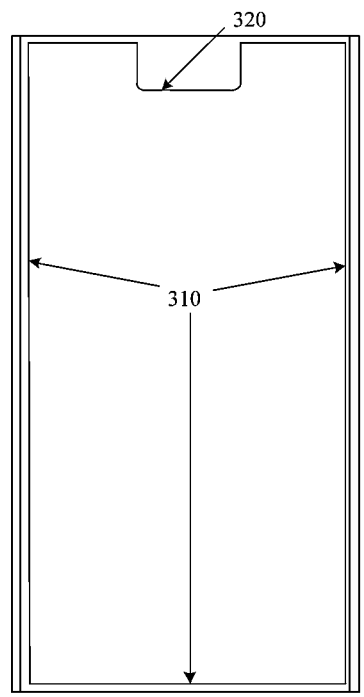
Figure 7:
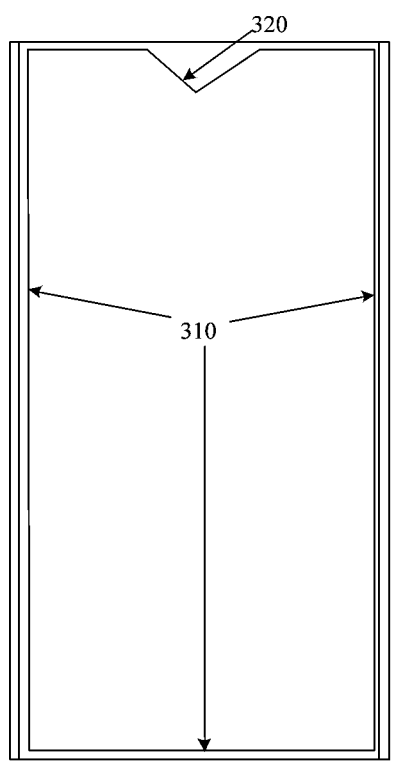

The terminal includes the special-shaped screen and an outer frame, in accordance with an embodiment of present disclosure. The outer frame may include two first edges and two second edges. Two first edges are substantially parallel to each other, and two second edges are substantially parallel to each other. The special-shaped screen includes a concave sub-edge and three straight sub-edges. The concave sub-edge is attached to one of the first edges. Two of the three straight sub-edges are connected to the concave sub-edge, and substantially parallel to each other. The two of the three straight sub-edges are respectively attached to the two second edges. The other of the three straight sub-edges is attached to another one of the first edges. A length of the first edge is not larger than that of the second edge. The concave sub-edge and the outer frame of the terminal cooperatively define a special-shaped notch region. The special-shaped notch region is configured to accommodate a sensor in a front casing of the terminal. The concave sub-edge can include a concave portion defined by a poly line or a curve line. For example, as illustrated in FIG. 3 to FIG. 7, FIG. 3 to FIG. 7 illustrate schematic views of five possible forms of a special-shaped screen. In the various forms illustrated above, the straight sub-edge 310 may be a rounded straight-line segment or a straight-line segment. The concave sub-edge 320 can have any one of the forms in the five possible forms as illustrated in FIGS. 3 to 7. In FIG. 3, the concave sub-edge 320 is an edge with a semicircular notch. In FIG. 4, the concave sub-edge 320 is an edge with an arc-shaped notch. In FIG. 5, the concave sub-edge 320 is an edge with a rectangular notch. In FIG. 6, the concave sub-edge 320 is an edge with a rounded rectangular notch. In FIG. 7, the concave sub-edge 320 is an edge with a triangular notch. It should be noted that the specific shape of the special-shaped screen is not limited in the embodiments of the present disclosure. The above five forms are part of the appearance of the special-shaped screen of terminal to which the solution of the present disclosure can be applied.

Alternatively, taking FIG. 3 as an example, the outer frame of the terminal includes two first edges 321, 313, and two second edges 311, 312. One first edge 321 is attached to the concave sub-edge 320. The two second edges 311, 312 are respectively attached to the two straight sub-edges that are connecting to the concave sub-edge 320. Another first edge 313 is parallel to the first edge 312.

Alternatively, the terminal may be selected from a group consisting of a mobile phone, a tablet computer, a smart glass, a smart watch, a digital camera, an MP4 playback terminal, an MP5 playback terminal, a learning machine, a dot reading machine, an electronic paper book, an electronic dictionary, a virtual reality (VR) play terminal, or an augmented reality (AR) play terminal, etc.

Figure 8:
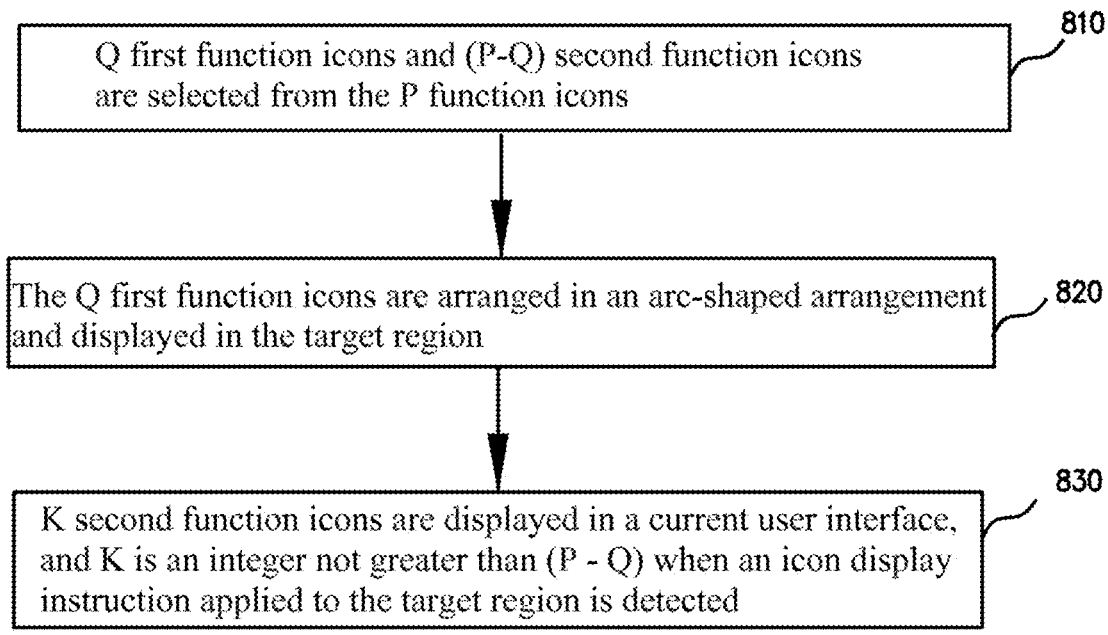
FIG. 8 illustrates a schematic flowchart of a method for displaying icons, in accordance with an embodiment of present disclosure.

As illustrated in FIG. 8, FIG. 8 illustrates a schematic flowchart of a method for displaying icons, in accordance with an embodiment of present disclosure. The method for displaying icons can be implemented by the above-mentioned terminal with the special-shaped screen or any terminal having a display screen. In FIG. 8, the method for displaying icons may begin at block 810.

At block 810, Q first function icons and (P−Q) second function icons are selected from the P function icons. Q is a preset positive integer, and P is an integer greater than Q.

In the embodiments of the present disclosure, in a possible implementation, the terminal can determine the value of P as the number of the function icons according to a configuration of the user.

In another possible implementation, the terminal can release setting permissions of the function icons to allow the user to independently select the function icons that need to be displayed in the target region.

In another possible implementation, the terminal can also lock a certain number of function icons while release the setting permissions of other function icons to the user.

For example, in a possible implementation, taking the display manner illustrated in FIG. 1 as an example, the user can determine whether the seven function icons, including the function icon 111, the function icon 112, the function icon 113, the function icon 114, the function icon 115, the function icon 116, and the function icon 117, are displayed in the target region.

In another possible implementation, the terminal may lock a certain number of first function icons in advance, and release the setting permissions of other first function icons to the user. For example, the terminal may lock the function icon 114 to allow the user to determine whether the function icon 111, the function icon 112, the function icon 113, the function icon 115, the function icon 116, and the function icon 117 are to be displayed in the target region. For another example, the terminal can also lock the function icon 111, the function icon 112, the function icon 113, and the function icon 114, and directly determine the above four function icons as function icons to be displayed in the target region. The user only determines whether other icons of other applications are used as function icons. When the user selects 5 function icons as function icons, the number of function icons is 9.

In a possible implementation, the terminal determines the first Q function icons as the first function icons, and determines the (Q+1)th to the Pth function icons as the (P−Q) second function icons, according to an order of the P function icons in the terminal.

Alternatively, the order may be a time sequence in which the activation icons of the applications are determined as the function icon chronologically. For example, a function icon A was determined as a function icon at 21:29:37 on Sep. 3, 2016, while a function icon B was determined as a function icon was 08:47:20 on Oct. 4, 2016, the order of the function icon A is arranged before the function icon B.

Alternatively, the order may also be an order of times that the function icons have been involved in history, which is ordering from more to less.

Alternatively, the order may also be the sequence of time intervals between the last times that the function icons was involved and a present moment of the terminal, which is ordering from short to long.

At block 820, the Q first function icons are arranged in an arc-shaped arrangement and displayed in a first target region. The first target region is a display region that is adjacent to the edge of the display screen or surrounds the special-shaped notch region.

In the embodiments of the present disclosure, the terminal can arrange Q first function icons in an arc-shaped arrangement and display the Q first function icons in the first target region. In a possible implementation, the terminal may arrange Q first function icons in an arc-shaped arrangement and display the Q first function icons at a region attached to the edge of the display screen. In another possible implementation, the terminal may arrange Q first function icons in an arc-shaped arrangement and display the Q first function icons at a region around the special-shaped notch region.

At block 830, K second function icons are displayed in a current user interface, and K is an integer not greater than (P−Q) when an icon display instruction applied to the target region is detected.

In the embodiments of the present disclosure, the terminal may display the K second function icons in the current user interface when the terminal detects an icon display instruction applied to the target region, K is an integer not greater than (P−Q).

In a possible implementation, the K second function icons and the Q first function icons are simultaneously displayed in current user interface.

In another possible implementation, the K second function icons will replace K first function icons of the Q first function icons and be displayed.

In summary, the method for displaying icons provided in the embodiments can be implemented by the terminal with the special-shaped screen. The special-shaped screen includes a special-shaped notch region. The terminal selects Q first function icons and (P−Q) second function icons from the P function icons. Q is a preset positive integer, and P is an integer greater than Q. The Q first function icons are displayed in the target region and arranged in an arc-shaped arrangement. The target region is a display region that is adjacent to the edge of the special-shaped screen or surrounds the special-shaped notch region. When an icon display instruction applied to the target region is detected, K second function icons are displayed in a current user interface, and K is an integer not greater than (P−Q).

Because this method is implemented by the terminal with the display screen, when there are many function icons displayed on the edge of the terminal screen in the arc arrangement, the terminal can display the originally hidden function icons in the user interface for reposing to the icon display instruction, which enables the user to activate the specified application through the function icon. Operations for searching for the icon of the specified application may be simplified, a speed at which the terminal displays the function icon of the specified application may be increased, and an efficiency of activating the specified application is therefore improved.

Based on the previous embodiment, the terminal can display the second function icons in a scrolling visual manner, as illustrated in the following embodiment.

Figure 9:
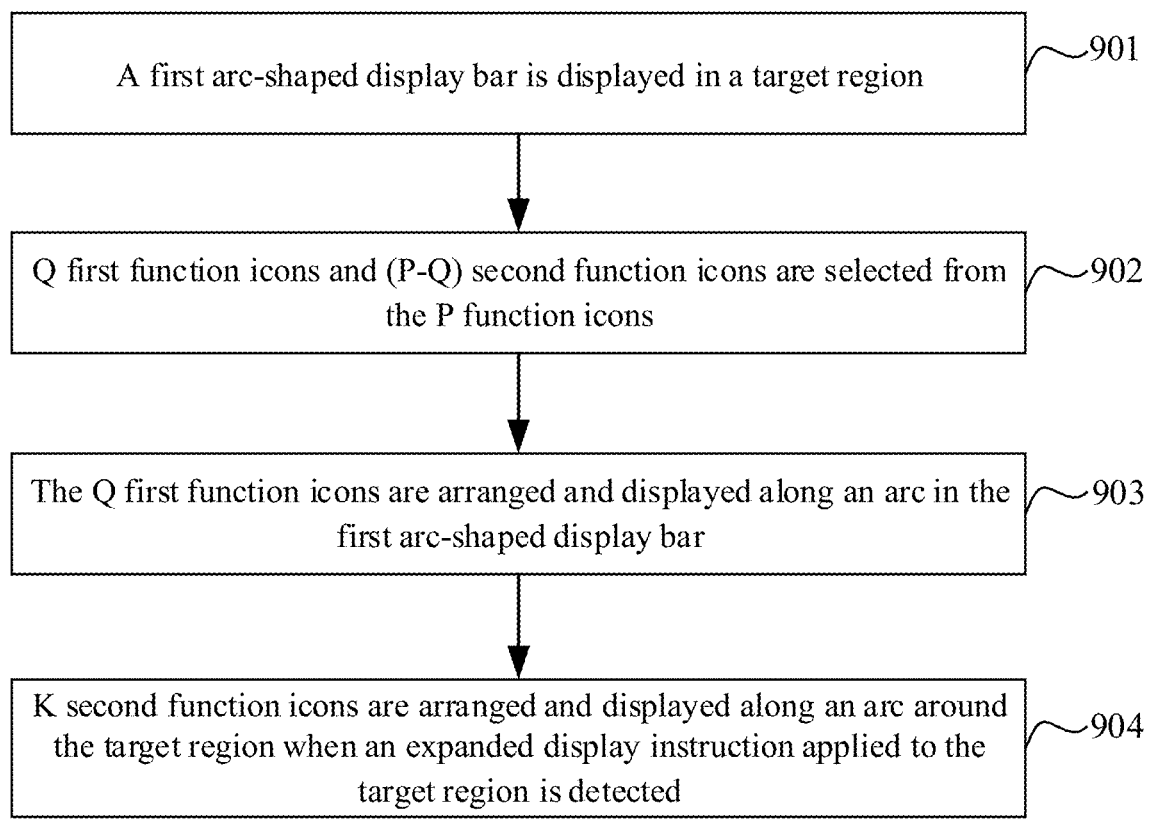
FIG. 9 illustrates a schematic flowchart of a method for displaying icons, in accordance with another embodiment of present disclosure.

As illustrated in FIG. 9, FIG. 9 illustrates a schematic flowchart of a method for displaying icons, in accordance with another embodiment of present disclosure. This method for displaying icons can be implemented by any one of the terminals illustrated in FIGS. 1 to 7 or any terminal having a display screen. In FIG. 9, the method for displaying icons may begin at block 910.

At block 901, a first arc-shaped display bar is displayed in a target region.

In the embodiments of the present disclosure, the terminal can display the first arc-shaped display bar in the target region. The first arc-shaped display bar can be displayed in a region adjacent to an edge of the display screen, or around the special-shaped notch region of the special-shaped screen.

In the embodiments of the present disclosure, the terminal may display the first arc-shaped display bar in a region around the special-shaped notch region. In a possible implementation, for example, the terminal may display the first arc-shaped display bar 110 as illustrated in FIG. 1 and FIG. 2. In another possible implementation, the terminal may also display the first arc-shaped display bar in a region adjacent to an edge other than the edge in which the special-shaped notch region defined. Taking FIG. 3 as an example, the terminal may also display the first arc-shaped display bar in a region adjacent to the straight-line sub-edge 310. For example, the terminal may display the first arc-shaped display bar in a region adjacent to the straight-line sub-edge 311, the straight-line sub-edge 312, or the straight-line sub-edge 313. Function icons are displayed in the first arc-shaped display bar.

Alternatively, when the function icon is an activation icon of a screen recording service and the function icon is triggered, the terminal will involve the screen recording service.

Alternatively, when the function icon is an activation icon of a screen recording service and the function icon is triggered, the terminal will capture a screenshot of the current user interface. In a possible implementation, the terminal will capture image layers excepting an image layer that is configured to display the first arc-shaped display bar, and superimpose and fuse the images displayed on the captured image layers, and generate a final screenshot image.

At block 902, Q first function icons and (P−Q) second function icons each included in the P function icons are selected from the P function icons.

It should be noted that the operation in block 902 is identical to the operation in block 810, which will not be repeated here.

At block 903, the Q first function icons are arranged and displayed along an arc in the first arc-shaped display bar.

The Q first function icons is arranged in an arc-shaped arrangement and displayed in the first arc-shaped display bar.

In the embodiments of the present disclosure, the terminal may arrange the Q first function icons in an arc-shaped arrangement, and display the Q first function icons in the first arc-shaped display bar.

In at block 904, K second function icons are arranged and displayed along an arc around the first target region, i.e., the first arc-shaped display bar, when an expanded display instruction applied to the target region is detected.

In the embodiments of the present disclosure, K is an integer not greater than (P−Q).

As an alternative implementation of block 904, the terminal can execute block 904 by performing operations of sub-block (1) and sub-block (2).

At sub-block (1), a second target region is determined when an expanded display instruction applied to the first arc-shaped display bar is detected, the second target region is determined based on an edge of the first target region that is adjacent to a center of the screen. The second target region is attached to the first target region.

In the embodiments of the present disclosure, when the terminal detects the expanded display instruction applied to the first arc-shaped display bar, it determines the second target region based on the edge of the first arc-shaped display bar that is adjacent to the center of the screen. The second target region may be a second arc-shaped display bar.

For example, when a length of an edge of the first arc-shaped display bar is L1, the length of the second arc-shaped display bar may be determined according to the length L1 of the edge of the first arc-shaped display bar.

At sub-block (2), K second function icons are displayed in the second target region.

In the embodiments of the present disclosure, the second target region may be a second arc-shaped display bar. The terminal can display the K second function icons in the second arc-shaped display bar. Alternatively, an order of the K second function icons can be manually adjusted by the user. Alternatively, the order of the K second function icons may also be predetermined in advance.

It should be noted that the second arc-shaped display bar can be displayed in a different shapes corresponding to different expanded display instructions, which will be described in the following, taking a first display mode, a second display mode, and a third display mode as examples.

The first display mode: in this display mode, the first arc-shaped display bar includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the second target region is determined only based on an edge of a target sub-region adjacent to the center of the screen when the expanded display instruction applied to the target sub-region is detected. The target sub-region is one of the at least two sub-regions. Alternatively, the second target region may be a second arc-shaped display bar.

Alternatively, the terminal may separately display at least one of the above three sub-regions. A displayed sub-region, or a displayed combination of multiple sub-regions is considered as the target sub-regions. For example, the terminal may display only one of the first sub-region 110a, the second sub-region 110b, or the third sub-region 110c. For another example, the terminal may also display two of the first sub-region 110a, the second sub-region 110b, and the third sub-region 110c.

In a possible implementation, in order to enhance the user's visual effect, the terminal may display at least two sub-regions adjacent to each other at the same time. For example, the terminal may display the first sub-region 110a and the second sub-region 110b at the same time, or display the second sub-region 110b and the third sub-region 110c at the same time.

Figure 10:
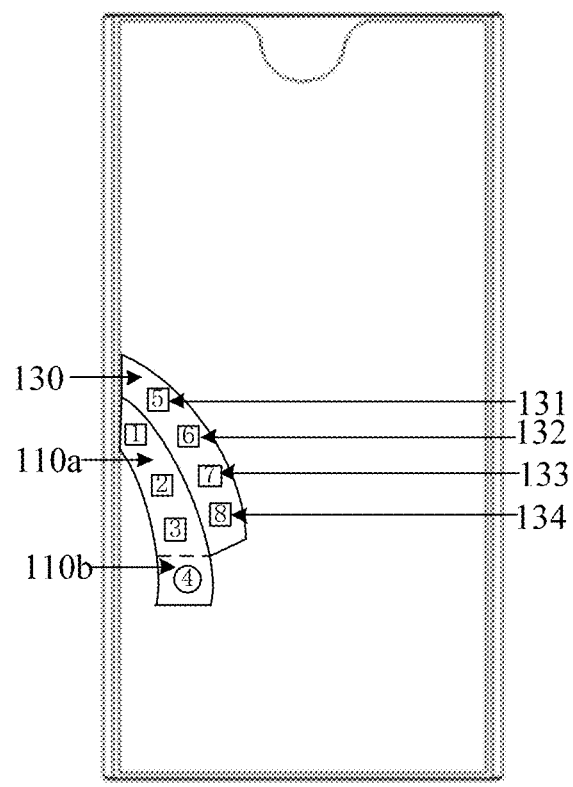
FIG. 10 illustrates a schematic view of an operation of displaying a second function icon in the method of FIG. 9.

As illustrated in FIG. 10, FIG. 10 illustrates a schematic view of an operation of displaying a second function icon in the method of FIG. 9. In FIG. 10, the terminal displays the first sub-region 110a and the second sub-region 110b of the first arc-shaped display bar. When the terminal detects the expanded display instruction applied to the first arc-shaped display bar, the terminal displays the second arc-shaped display bar 130 in a region attached to an edge of the first arc-shaped display bar that is adjacent to the center of the screen; and in this example, the second arc-shaped display bar 130 is displayed in a region attached to only an edge of the first sub-region 110a close to the center of the screen. It should be noted that, the length of an edge of the second arc-shaped display bar 130 in the first display mode may be similarly determined in a way as described in the second display mode below; in addition, the second arc-shaped display bar 130 may also be displayed in a region attached to only an edge of the second sub-region 110b close to the center of the screen. The terminal displays the K second function icons in the second arc-shaped display bar 130 when the second arc-shaped display bar 130 is displayed. In FIG. 10, K equals to 4, and the K second function icons include 4 second function icons including a function icon 131, a function icon 132, a function icon 133, and a function icon 134.

The display mode 2, in this display mode, the first arc-shaped display bar also includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the terminal displays the first sub-region 110a, the second sub-region 110b, and the third sub-region 110c at the same time. When the terminal detects the expanded display instruction that is applied to the first arc-shaped display bar, the terminal determines which sub-region the expanded display instruction is applied to. After determining the sub-region to which the expanded display instruction is applied, the second arc-shaped display bar will be displayed next to the sub-region to which the expanded display instruction is applied. A length of an edge of the second arc-shaped display bar is equal to that of an edge of the determined sub-region that is adjacent to the center of the screen.

Figure 11:
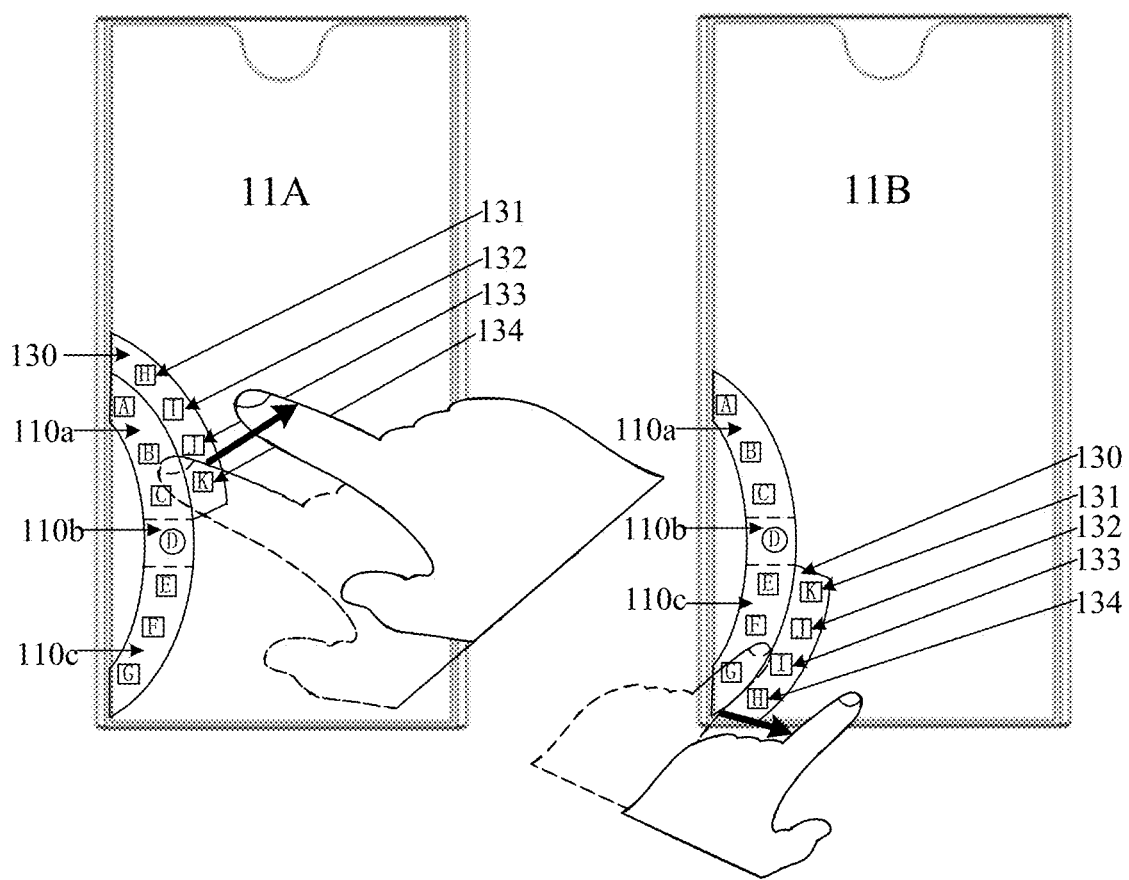
FIG. 11 illustrates another schematic view of the operation of displaying a second function icon in the method of FIG. 9.

As illustrated in FIG. 11, FIG. 11 illustrates another schematic view of the operation of displaying a second function icon in the method of FIG. 9. In FIG. 11, the terminal displays a first arc-shaped display bar 110. The first arc-shaped display bar 110 includes a first sub-region 110a, a second sub-region 110b, and a third sub-region 110c. When the terminal detects the expanded display instruction, the terminal determines the display position and size of the second arc-shaped display bar according to the specific position to where the expanded display instruction is applied.

For example, in the user interface 11A, when the terminal detects that the expanded display instruction (an instruction generated according to a sliding operation performed from an edge of the first arc-shaped display bar away from the center of the screen towards the center of the screen by the user) is applied to the first sub-region 110a, the terminal will display the second arc-shaped display bar 130 basing on the edge of the first sub-region 110a adjacent to the center of the screen. The terminal displays the K second function icons in the second arc-shaped display bar 130 upon displaying the second arc-shaped display bar 130. In the user interface 11A, K equals to 4, the K second function icons include 4 second function icons including a function icon 131, a function icon 132, a function icon 133, and a function icon 134. The length of the second arc-shaped display bar 130 is substantially the same as the length of the edge of the first sub-region 110a to which the second arc-shaped display bar 130 is attached.

For another example, in the user interface 11B, when the terminal detects that the expanded display instruction (an instruction generated according to a sliding operation performed from an edge of the first arc-shaped display bar away from the center of the screen towards the center of the screen by the user) is applied to the third sub-region 110c, the terminal displays the second arc-shaped display bar 130 basing on the edge of the third sub-region 110c adjacent to the center of the screen. The terminal displays K second function icons in the second arc-shaped display bar 130 upon displaying the second arc-shaped display bar 130 is displayed. In the user interface 11B, K equals to 4, the K second function icons include 4 second function icons including a function icon 131, a function icon 132, a function icon 133, and a function icon 134. The length of the second arc-shaped display bar 130 is substantially the same as the length of the edge of the third sub-region 110c to which the second arc-shaped display bar 130 is attached.

The display mode 3: in this display mode, the first arc-shaped display bar also includes at least two sub-regions. Taking the first arc-shaped display bar 110 illustrated in FIG. 1 as an example, the first arc-shaped display bar 110 of the terminal can be divided into three sub-regions including a first sub-region 110a, a second sub-region 110b, and a third sub-region 110c.

In this display mode, the terminal displays the first sub-region 110a, the second sub-region 110b, and the third sub-region 110c at the same time. When the terminal detects an expanded display instruction applied to the first arc-shaped display bar, the terminal directly displays the second arc-shaped display bar 130 based on the edge of the entire of the first arc-shaped display bar adjacent to the center of the screen. After the second arc-shaped display bar 130 is displayed, the terminal displays the K second function icons in the second arc-shaped display bar.

Figure 12:
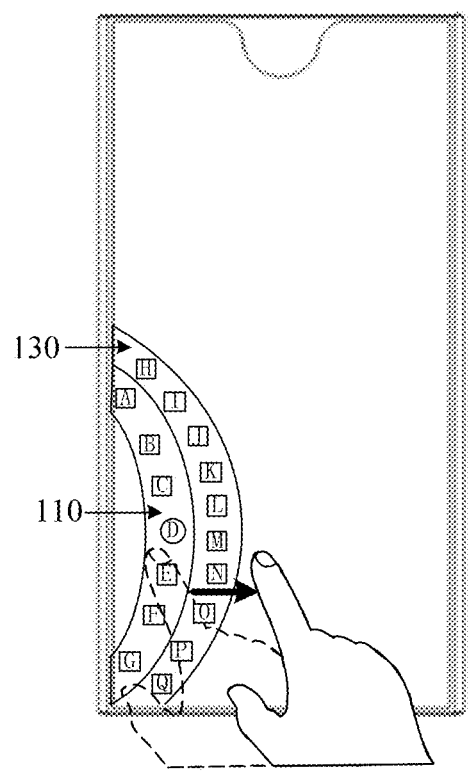
FIG. 12 illustrates still another schematic view of the operation of displaying a second function icon in the method of FIG. 9.

As illustrated in FIG. 12, FIG. 12 illustrates still another schematic view of the operation of displaying a second function icon in the method of FIG. 9. In FIG. 12, the terminal displays a first arc-shaped display bar 110 on which function icons A to F are displayed. When the terminal detects the expanded display instruction, the terminal displays the second arc-shaped display bar 130 based on the edge of the first arc-shaped display bar 110 adjacent to the center of the screen. Upon displaying the second arc-shaped display bar 130, the terminal displays the K second function icons, such as function icons H to Q, in the second arc-shaped display bar 130. Alternatively, K may equal to 10 in the embodiment illustrated in FIG. 12.

It should be noted that the sizes of the second arc-shaped bars in the above-mentioned first display mode, the second display mode, and the third display mode are different from each other, the number K of the second function icons that the terminal can display in these display modes will also be different from each other. For example, in the first display mode or the second display mode, three second function icons are displayed in the second arc-shaped display bar. In the third display mode, seven second function icons can be displayed in the second arc-shaped display bar. In addition, in any of the three display modes, the expanded display instruction may be generated in response to a sliding operation sliding from an edge of the first arc-shaped display bar away from the center of the screen towards the center of the screen. Also, in response to detecting a sliding operation sliding from the center of the screen towards the edge of the first arc-shaped display bar away from the center of the screen, a display cancellation instruction may be generated, and in response to which, the display of the second arc-shaped bar and the second function icons therein is canceled.

In summary, in the method for displaying icons, in accordance with the embodiments, a first arc-shaped display bar is displayed in the target region, and Q first function icons and (P−Q) second functions icons are selected from the P function icons. The selected Q first function icons are arranged in an arc-shaped arrangement and displayed in the first arc-shaped display bar. When the expanded display instruction applied to the target region is detected, K second function icons are arranged in an arc-shaped arrangement around the target region and displayed. It can be seen that, in the method, by displaying the second function icons while displaying the first function icons, the function icons configured by the user can be quickly and completely displayed. When the user needs to involve the function icons in the first arc-shaped display bar and the function icons in the second arc-shaped display bar in sequence in a short time, operations for the user to switch different interfaces are simplified, and an efficiency of the user using the first function icons and the second function icons at the same time is improved.

Based on the above embodiments, the embodiments of the present disclosure also provide a method for displaying icons. In the method, the second function icons may be displayed in a scroll manner, as illustrated in the following embodiments.

Figure 13:
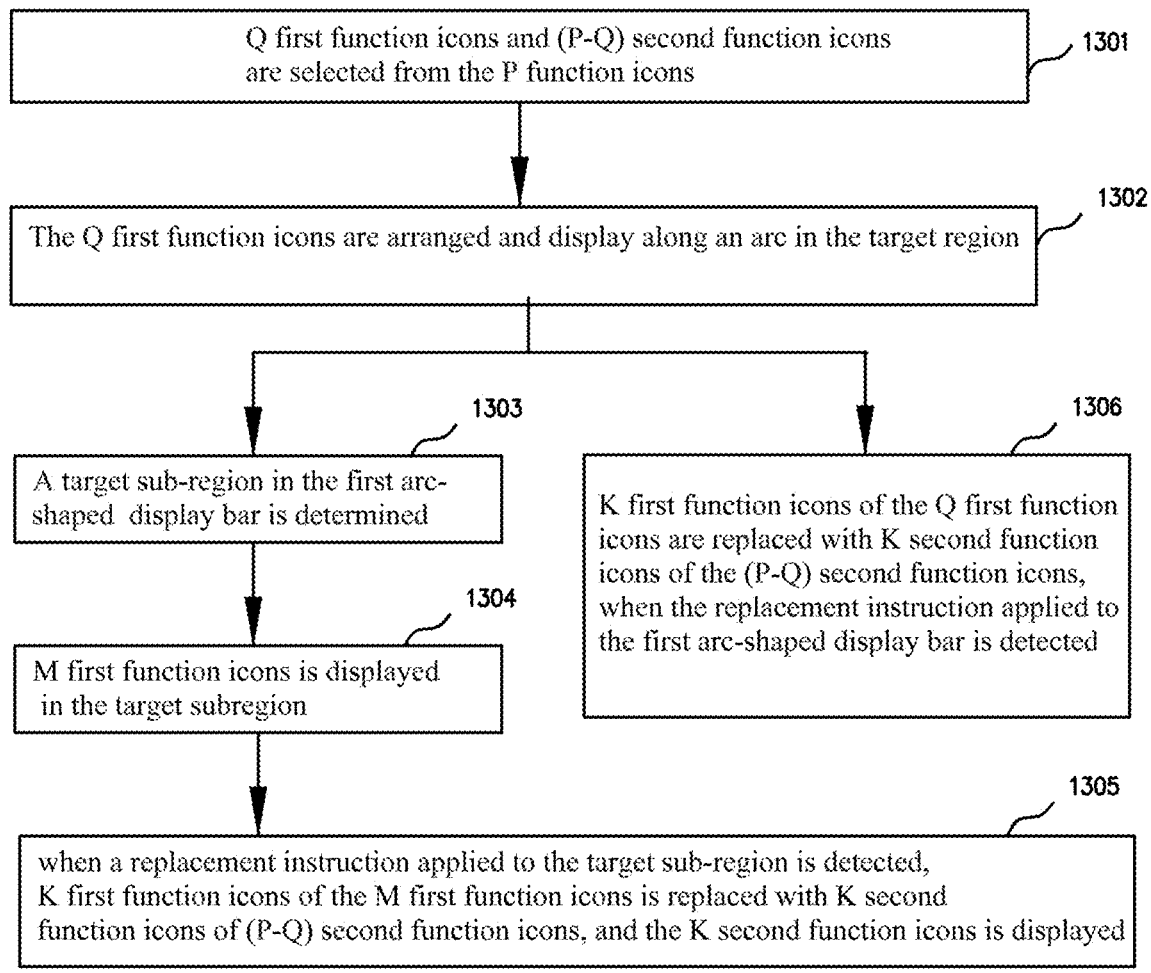
FIG. 13 illustrates a schematic flowchart of a method for displaying icons, in accordance with another embodiment of present disclosure.

As illustrated in FIG. 13, FIG. 13 illustrates a schematic flowchart of a method for displaying icons, in accordance with another embodiment of present disclosure. This method for displaying icons can be implemented by the terminal illustrated above or any terminal with a display screen. In FIG. 13, the method for displaying icons may begin at block 1301.

At block 1301, Q first function icons and (P−Q) second function icons are selected from the P function icons.

At block 1302, the Q first function icons are arranged and display along an arc in the target region.

It should be noted that the operation in block 1301 is identical to the operation in block 810, and operation in block 1303 is identical to the operation in block 820, which will not be repeated here.

In a possible implementation, a first arc-shaped display bar is displayed in the target region. When the terminal displays the first arc-shaped display bar attached to the edge of the display screen or around the special-shaped notch region, an edge function icon may be displayed in the first arc-shaped display bar. The edge function icon is one of the (P−Q) second function icons. The edge function icon is divided into two portions, including a hidden portion and a visible portion, by the edge of the screen. The visible portion is displayed in the first arc-shaped display bar. Alternatively, the hidden portion may be scrolled into the first arc-shaped display bar so as to be displayed when the terminal detects a sliding operation or a dragging operation from the visible portion toward the center of the screen.

It can be seen that displaying the edge function icon may remind the user that the first arc-shaped display bar can be scrolled to display other function icons, which may improve the display effect of the function icons and reduces the user's learning cost and operation difficulty.

Figure 14:
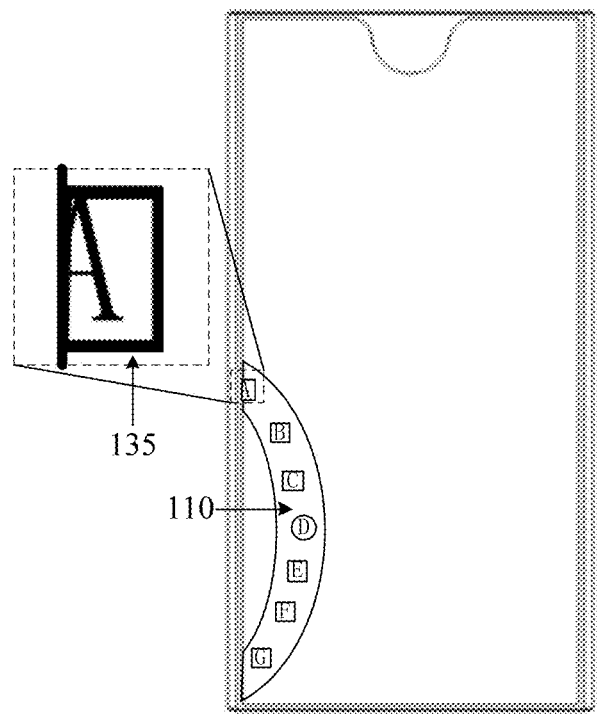
FIG. 14 illustrates a schematic view of an operation of displaying icon at an edge in the method of FIG. 13.

As illustrated in FIG. 14, FIG. 14 illustrates a schematic view of an operation of displaying icon at an edge in the method of FIG. 13. In FIG. 14, the function icons are displayed in the first arc-shaped display bar 110. The edge function icons 135 are displayed in the first arc-shaped display bar 110. The edge function icon 135 is divided into a visible portion and a hidden portion, where the visible portion is visible in the first arc-shaped display bar 110. When a sliding operation or a dragging operation performed from the visible portion toward the center of the screen or toward the center of the first arc-shaped display bar 110 is detected, the hidden portion can be scrolled into the first arc-shaped display bar 110.

In the embodiments of the present disclosure, block 1303, block 1304, and block 1305 may be performed, or block 1306 may be performed, after the terminal performs block 1301 and block 1302.

At block 1303, a target sub-region in the first arc-shaped display bar is determined.

In the embodiments of the present disclosure, the terminal may determine the target sub-region according to a configuration of the user. In another possible implementation, the terminal may also determine the target sub-region according to a default configuration.

Taking the first arc-shaped display bar 110 illustrated in FIG. 1 as an example, the terminal may determine the third sub-region 110c as the target sub-region according to the configuration of the user. The terminal may also determine the first sub-region 110a as the target sub-region according to default configuration.

At block 1304, M first function icons are displayed in the target sub-region.

In the embodiments of the application, the terminal displays the M first function icons in the target sub-region. The target sub-region is one of the at least two sub-regions of the first arc-shaped display bar. M is a positive integer not less than K and not greater than Q.

At block 1305, when a replacement instruction applied to the target sub-region is detected, K first function icons of the M first function icons are replaced with K second function icons of (P−Q) second function icons, and the K second function icons are displayed.

In the embodiments of the present disclosure, K is not greater than the smaller one of M and (P−Q). When the terminal detects the replacement instruction applied to the target sub-region, it can determine the value of K according to the replacement instruction. In a possible implementation, the replacement instruction may be generated according to a sliding operation. The sliding operation may be along a tangent direction of an arc defined by the first arc-shaped display bar. Alternatively, the terminal may determine the value of K according to a sliding displacement of the sliding operation on the touch screen. Exemplarily, the terminal may determine the value of K according to the corresponding relationship illustrated in Table 1.

TABLE 1

| | sliding displacement (cm) | | |
| --- | --- | --- | --- |
| | (0, 1] | (1, 2] | (2, 3] |
| K | 1 | 2 | 3 |

The terminal can select the K first function icons that are to be replaced from the M first function icons according to a direction of the sliding operation, after the terminal determines the value of K according to the sliding displacement of the sliding operation on the screen. The terminal then generates the replacement instruction correspondingly. The terminal may replace the K first function icons with K second function icons of the (P−Q) second function icons according to the replacement instruction.

In another possible implementation, the terminal directly determines K as the smaller one of (P−Q) and M. Subsequently, when the terminal generates the replacement instruction when detects the sliding operation, the M first function icons are directly replaced by the K second function icons according to the replacement instruction. Alternatively, the terminal may select the K second function icons that are used to replace the first function icons according to the direction in which the sliding operation slides on the screen. When the terminal detects that the direction of the sliding operation is in a first direction, the terminal replaces the M first function icons with K1 second function icons. When the terminal detects that the direction of the sliding operation is in a second direction, the terminal replaces the M first function icons with K2 second function icons. The first direction and the second direction are opposite. K1 is not greater than the smaller one of (P−Q) and M, and K2 is not greater than the smaller one of (P−Q) and M, and the sum of K1 and K2 is not greater than (P−Q). The K1 second function icons and the K2 second function icons are different.

For example, there are 3 (the value of M) first function icons displayed in the target sub-region, and there are 5 (the value of (P−Q)) second function icons. The terminal may replace the 3 first function icons with 3 (the value of K1) second function icons when the terminal detects a sliding operation performed on the target sub-region along a downward direction. Alternatively, the terminal may replace the 3 first function icons with 2 (the value of K2) second function icons when the terminal detects a sliding operation performed on the target sub-region along an upward direction. It should be noted, the first function icons displayed in other sub-regions may be unchanged during the replacement operation, and only the first function icons displayed in the target sub-region can be replaced during the replacement operation; that is, the first function icons displayed in other sub-regions may be locked function icons, and the first function icons displayed in the target sub-region may be replaceable function icons (in this case, M is equal to (Q−L)), in which the locked function icons and the replaceable function icons will be described below.

Figure 15:
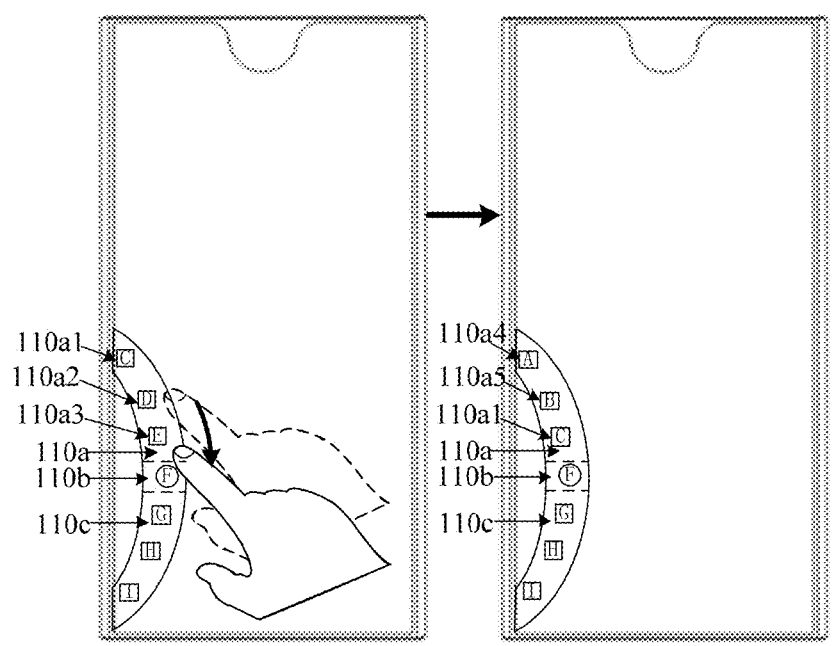
FIG. 15 illustrates a schematic view of replacing the first function icons with second function icons in the method of FIG. 13.

As illustrated in FIG. 15, FIG. 15 illustrates a schematic view of replacing and displaying the second function icon in the method of FIG. 13. In FIG. 15, the target sub-region is determined as the first sub-region 110a of the first arc-shaped display bar 110. The function icon 110a2 and function icon 110a3 in the first sub-region 110a may be scrolled out of the first sub-region 110a and hidden by the terminal when the terminal detects a sliding operation in the first sub-region 110a towards the third sub-region 110c. The function icon 110a1 is scrolled to a location in the first sub-region 110a that is adjacent to the second sub-region. A function icon 110a4 and a function icon 110a5 are displayed in an upper portion of the first sub-region 110a. Alternatively, the function icons 110a4 and 110a5 may replace all of the function icons 110a1, 110a2 and 110a3 when the terminal detects the sliding operation in the first sub-region 110a towards the third sub-region 110c. Furthermore, when the terminal detects a sliding operation in the first sub-region 110a away from the third sub-region 110c, at least a part of the function icons 110a1, 110a2 and 110a3 may be replaced by other function icons different from the function icons 110a4 and 110a5. It should be noted, the target sub-region may also be determined as the second sub-region 110b or the third sub-region 110c of the first arc-shaped display bar 110.

It can be seen that the embodiments of the present disclosure disclose a solution for scrolling icons in different regions.

At block 1306, K first function icons of the Q first function icons are replaced with K second function icons of the (P−Q) second function icons, when the replacement instruction applied to the first arc-shaped display bar is detected.

In the embodiments of the present disclosure, K is a positive integer, and K is not greater than the smaller one of Q and (P−Q). The replacement instruction may be an instruction generated according to a sliding operation. The sliding operation may be along the tangent direction of the arc defined by the first arc-shaped display bar, for example along an outer edge of the first arc-shaped display bar.

Alternatively, the terminal may determine the value of K according to the sliding displacement of the sliding operation on the touch screen. Exemplarily, the terminal may determine the value of K according to a correspondence relationship illustrated in Table 2. Table 2 shows the correspondence relationship of the sliding displacement and the value of K.

TABLE 2

| | sliding displacement (cm) | | | | | |
|---|---|---|---|---|---|---|
| | (0, 1] | (1, 2] | (2, 3] | (3, 4] | (4, 5] | (5, 6] |
| K | 1 | 2 | 3 | 4 | 5 | 6 |

Figure 16:
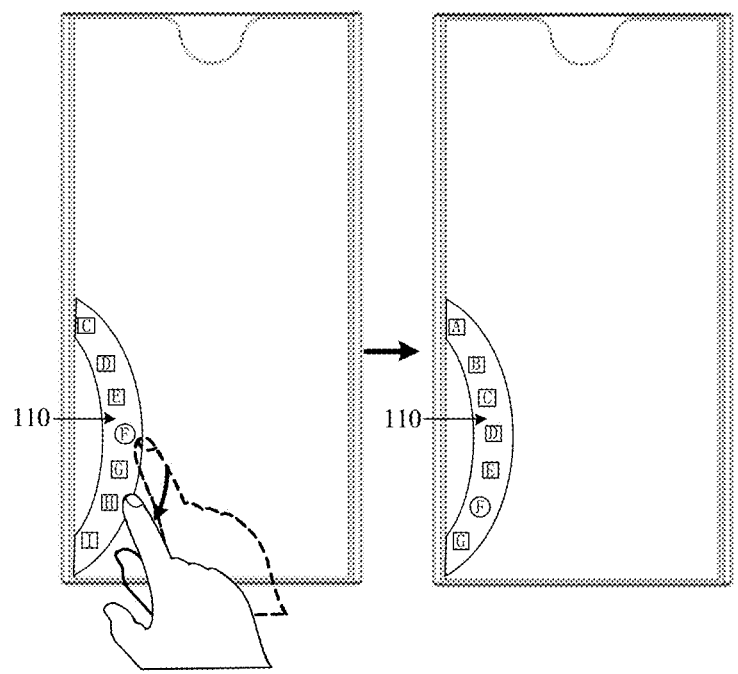
FIG. 16 illustrates another schematic view of replacing the first function icons with second function icons in the method of FIG. 13.

After the terminal determines the value of K according to the sliding displacement of the sliding operation on the screen, the terminal may select the K first function icons, which are to be replaced by the second function icons, from the Q first function icons according to the direction of the sliding operation, and then generate the replacement instruction accordingly. The terminal replaces the K first function icons with the K second function icons according to the replacement instruction. For example, as illustrated in FIG. 16, FIG. 16 illustrates another schematic view of replacing the first function icons with second function icons in the method of FIG. 13. In FIG. 16, the function icons displayed in the first arc-shaped display bar 110 may be all scrolled down by the terminal when the terminal detects a sliding operation applied on the first arc-shaped display bar 110. In FIG. 16, the function icon H and the function icon I at the bottom portion are scrolled out of the first arc-shaped display bar 110, and the function icon A and the function icon B are scrolled into the upper portion of the first arc-shaped display bar 110, and displayed in the first arc-shaped display bar 110.

It should be noted that, in a possible implementation, the method provided in the embodiments of the present disclosure further includes the following operations. In the method, L locked function icons are selected from the Q first function icons, and L is an integer not greater than (Q−K). K first function icons of the Q first function icons are replaced with K second function icons of the (P−Q) second function icons when the replacement instruction applied to the first arc-shaped display bar is detected. In particular, K first function icons, which are selected from the Q first function icons excepting the L locked function icons, are replaced with K second function icons of the (P−Q) second function icons when the replacement instruction applied to the first arc-shaped display bar is detected. That is, other (Q−L) first function icons of the Q first function icons are replaceable function icons.

Figure 17:
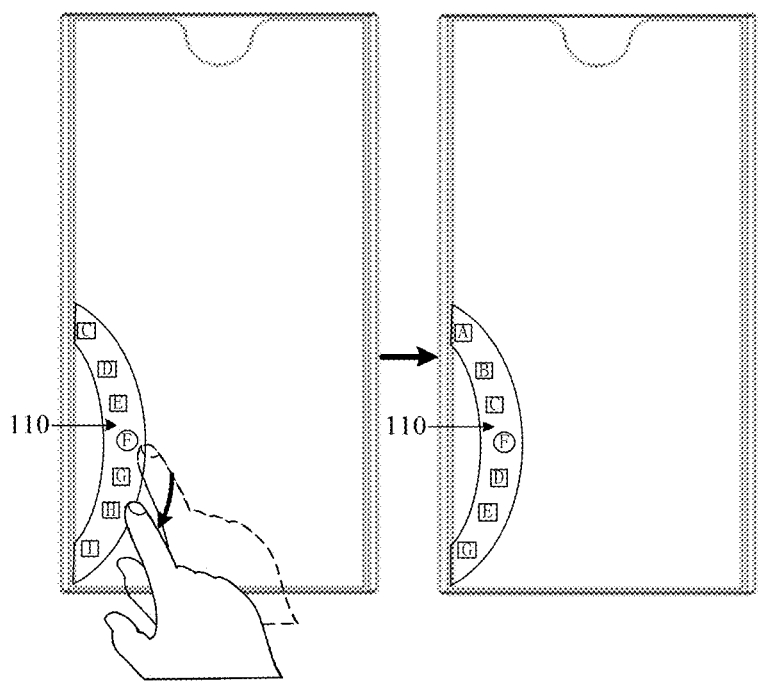
FIG. 17 illustrates a schematic view of replacing the first function icons with second function icons in a situation in which an icon is locked, in the method of FIG. 13.

In a possible implementation, as illustrated in FIG. 17, it illustrates a schematic view of replacing the first function icons with second function icons in a situation in which at least one function icon is a locked function icon, in the method of FIG. 13. In FIG. 17, the terminal determines, as the locked function icon, the function icon F from seven displayed first function icons including the function icon C, the function icon D, the function icon E, the function icon F, the function icon G, the function icon H, and the function icon I. That is, other function icons different than icon F are all replaceable function icons of the Q first function icons. The terminal may replace two replaceable function icons (the function icon H and the function icon I) of the seven first function icons with the function icons A and the function icon B when the terminal detects the replacement instruction applied to the first arc-shaped display bar 110. In particular, in the function icons of the first arc-shaped display bar 110, the location of the locked function icon F remains unchanged, and other icons may be scrolled to the lower portion of the first arc-shaped display bar 110 during the replacement operation. Specifically, the function icon A and the function icon B may be scrolled into the upper portion of the first arc-shaped display bar 110, and the function icon H and the function icon I may be scrolled out of the lower portion of the first arc-shaped display bar 110. It should be noted that, the number of the locked function icons is not limited to one, and the location of the locked function icons is not limited to the center of the first arc-shaped display bar; other number and locations of the locked function icons are also feasible. For example, there may be more than two locked function icons, and the at least two locked function icons may be displayed together without any replaceable function icons displayed therebetween, or the at least two locked function icons may be displayed in such a manner that every two adjacent locked function icons are separated by at least one replaceable function icons.

In another possible implementation, the L locked function icons are selected from the Q function icons. In particular, an attribute of each of the function icons of the Q function icons are obtained. L function icons of the Q function icons with attributes indicating that the corresponding function icons should remain unchanged are determined as the L locked function icons.

In another possible implementation, the method provided in the embodiments of the present disclosure further includes the following operations. In the method, the first arc-shaped display bar is divided into Q sub-display-regions when Q is an integer not greater than P. The Q first function icons are displayed in the Q sub-display-regions in one-to-one correspondence.

In another possible implementation, a central icon is determined when Q is an integer not greater than P. The central icon is an icon of an object that provides system customization functions, and belongs to the Q function icons. The system customization function is a function corresponding to the current foreground application of the terminal. The center icon is displayed at the center of the first arc-shaped display bar, and the remaining (Q−1) function icons each included in the Q function icons are sequentially displayed adjacent to the center icon.

It should be noted that, the remaining (Q−1) function icons may be symmetrically distributed about the central icon when the value of Q is an odd number. When the value of Q is an even number, Q/2 function icons of the remaining (Q−1) function icons may be displayed on an upper side of the center icon, for example displayed from the center icon along a direction opposite to the gravitational direction, and (Q/2−1) icons of the remaining (Q−1) function icons may be displayed on a lower side of the center icon, for example displayed from the center icon along the gravitational direction.

In summary, in the method for displaying icons according to the illustrated embodiments, the first arc-shaped display bar is displayed in a region attached to the edge of the display screen or surrounding the special-shaped notch region. Q first function icons and (P−Q) second function icons are selected from the P function icons when there are P function icons. The target sub-region is determined in the first arc-shaped display bar. M first function icons are displayed in the target sub-region, and other first function icons are displayed in other sub-regions of the first arc-shaped display bar. The K first function icons of the M first function icons are replaced with K second function icons selected from the (P−Q) second function icons when a replacement instruction applied to the target sub-region is detected, while other first function icons displayed in other sub-regions of the first arc-shaped display bar are not replaced. Alternatively, K first function icons of the Q first function icons are replaced with K second function icons selected from the (P−Q) second function icons when a replacement instruction applied to the first arc-shaped display bar is detected. Because the method may be implemented by the terminal with the display screen, the terminal can display the originally hidden function icons in the user interface for responding to the icon display instruction when there are too many function icons arranged in arc-shaped arrangement and displayed at the edge of the terminal screen. Operations for the user to find the specified application are simplified without occupying additional display region. Therefore, the function icons may be quickly displayed, while there is enough space in the user interface to display other contents.

A device for displaying icons is provided in the following, in accordance with embodiments of the present disclosure. The device can be configured to perform the method for displaying function icon according to the embodiments. For details not disclosed in the embodiments of the device, may be illustrated in the embodiments of the method, in accordance with the embodiments of present disclosure.

Figure 18:
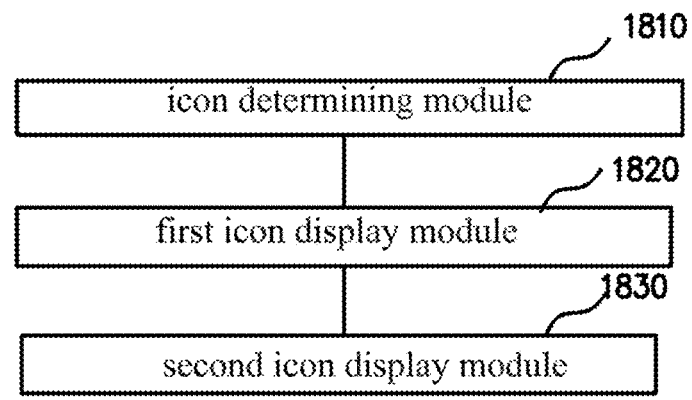
FIG. 18 illustrates a structural block diagram of a device for displaying icons, in accordance with an embodiment of the present disclosure.

As illustrated in FIG. 18, FIG. 18 illustrates a structural block diagram of a device for displaying icons, in accordance with an embodiment of the present disclosure. The device for displaying icons can be implemented as all or a part of the terminal via software, hardware or a combination of the two. The device includes an icon determining module 1810, a first icon display module 1820, and a second icon display module 1830.

The icon determining module 1810 is configured to select Q first function icons and (P−Q) second function icons from P function icons, where Q is a preset positive integer, and P is an integer greater than Q.

The first icon display module 1820 is configured to arrange the Q first function icons in an arc-shaped arrangement and display the Q first function icons in a first target region; the first target region being a display region attached to an edge of the display screen or surrounding the special-shaped notch region.

The second icon display module 1830 configured to display K second function icons in a current user interface when an icon display instruction applied to the first target region being detected, and K being an integer not greater than (P−Q).

In an alternative embodiment, the second icon display module 1830 is configured to arrange the K second function icons in an arc-shaped arrangement around the first target region, and display the K second function icons, when an expanded display instruction applied to the first target region is detected. K is an integer not greater than (P−Q).

In an alternative embodiment, the second icon display module 1830 is configured to determine a second target region and display the K second function in the second target region when an expanded display instruction applied to the first target region is detected. The second target region is determined based on an edge of the first target region that is adjacent to a center of the screen. The second target region is attached to the first target region.

In an alternative embodiment, the first target region includes at least two sub-regions. The second icon display module 1830 is configured to determine the second target region based on an edge of a target sub-region that is adjacent to the center of the screen when the expanded display instruction applied to the target sub-region is detected. The target sub-region is one of the at least two sub-regions.

In an alternative embodiment, the second icon display module 1830 is configured to replace K first function icons of the Q first function icons with K second function icons of the (P−Q) second function icons when a replacement instruction applied to the first target region is detected. K is a positive integer, and K is not greater than the smaller one of Q and (P−Q).

In an alternative embodiment, the first icon display module 1820 is configured to display M first function icons in a target sub-region. The target sub-region is one of the at least two sub-regions. M is a positive integer not less than K and not greater than Q. The second icon display module 1830 is configured to replace K first function icons of the M first function icons with K second function icons of the (P−Q) second function icons when a replacement instruction that applies to the target sub-region is detected.

In an alternative embodiment, the terminal further includes a third display module for displaying an edge function icon. The edge function icon is one of the (P−Q) second function icons. The edge function icon is divided into a visible portion and a hidden portion. The visible portion is displayed in the first target region.

In an alternative embodiment, the terminal further includes a determining module configured to select L locked function icons from the Q first function icons. L is an integer not greater than (Q−K). The second icon display module 1830 is configured to replace K first function icons, which are selected from the Q first function icons excepting the L locked function icons, with K second function icons of the (P−Q) second function icons when the replacement instruction applied to the first target region is detected.

In an alternative embodiment, the first target region of the terminal is a first arc-shaped display bar.

Figure 19:
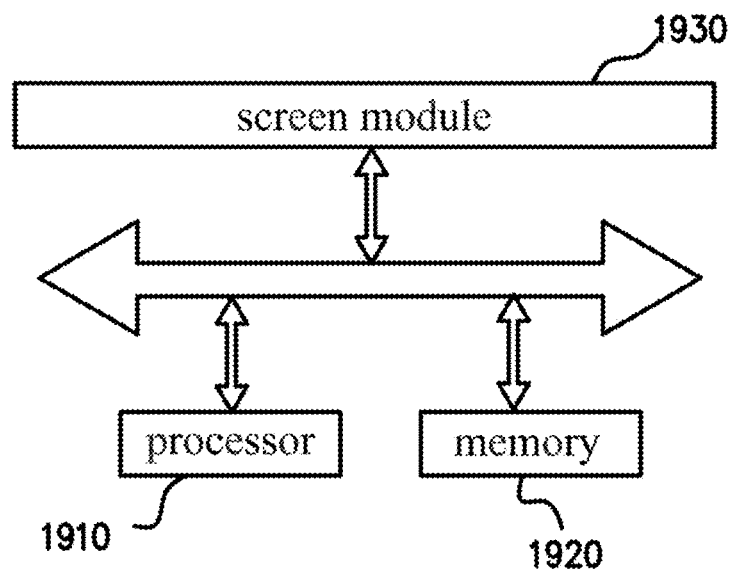
FIG. 19 illustrates a structural block diagram of a terminal, in accordance with an embodiment of the present disclosure.

As illustrated in FIG. 19, FIG. 19 illustrates a structural block diagram of a terminal, in accordance with an embodiment of the present disclosure. As illustrated in FIG. 19, the terminal includes a processor 1910, a memory 1920, and a screen module 1930. The memory 1920 stores instructions. The instructions are loaded and executed by the processor 1910 to perform the method for displaying icons as described in the above embodiments.

As illustrated in FIG. 20, FIG. 20 illustrates still another terminal 1000, in accordance with an embodiment of the present disclosure. The terminal 1000 includes an outer frame 300 and a special-shaped screen 100 connected to the outer frame 300.

The outer frame 300 may include two first edges 321, 313, and two second edges 311, 312. Two first edges 321, 313 are substantially parallel to each other, and two second edges 311, 312 are substantially parallel to each other.

The special-shaped screen 100 may be a touch screen with an irregular shape, the irregular shape is not a rectangle or a rounded rectangle. In the illustrated embodiment, the special-shaped screen 100 includes a non-display portion 110 with a special shape and a display portion 130 attached to the non-display portion 110. The non-display portion 110 may defines a notch to accommodate at least one component of the front panel such as a camera, a distance sensor (also known as a proximity sensor), an earpiece, and an ambient light brightness sensor.

The display portion 130 may include concave sub-edge 320 and three straight sub-edges 310. The concave sub-edge 320 is attached to one of the first edges 321. Two of the three straight sub-edges 310 are connected to the concave sub-edge 320, and substantially parallel to each other. The two of the three straight sub-edges 310 are respectively attached to the two second edges 311, 312. The other of the three straight sub-edges 310 is attached to the first edges 313. The notch is defined in the concave sub-edge 320 therefore forming the concave sub-edge 320.

It should be noted that, in this embodiment, the non-display region 110 may be hollow (such as a notch, a though hole, a recess defined at the edge therefore forming the non-display region 110). The hollow non-display region 110 may be equivalent to the special-shaped notch region in the above-mention embodiments. Therefore the terminal 1000 in this embodiment may also be configured to perform the methods for displaying icons in the above embodiments without limitation.

In other embodiments, the non-display region 110 may filled with a certain components such as a lens, a glasses, and displaying elements. In this situation, the special-shaped screen 100 may have a regular shape such as a rectangular forming by the special-shaped non-display portion 110 and the special-shaped display portion 130. It should be noted that, the non-display region 110 filled with other components may also be equivalent to the special-shaped notch region in the above-mention embodiments. Therefore the terminal 1000 in this embodiment may also be configured to perform the methods for displaying icons in the above embodiments without limitation. It should be noted that, the screen of the terminal 1000 is not limited to the special-shaped screen, and other display screens of different shapes or types are also applicable.

As illustrated in FIG. 21, FIG. 21 illustrates still another method for displaying icons, in accordance with one embodiment of the present disclosure. In this embodiment, method may be applied to any one of the terminals in the above embodiments. The terminal also includes a processor, a memory coupled to the processor, and a display screen comprising a non-display portion and a display portion attached to the non-display portion. The memory stores instructions, and the instructions are loaded and executed by the processor to perform the method for displaying icons. The method may begin at block 2010.

At block 2010, a first target region in the display portion is determined. The first target region is attached to an edge of the display portion or around the non-display portion. The first target region is in an arc shape extending along an arc.

At block 2020, a plurality of first function icons are displayed in the first target region along an extending direction of the first target region. The displayed first function icons may be in number of Q, and include L locked function icons and (Q–L) replaceable function icons.

At block 2030, a plurality of second function icons is displayed in the display portion when an icon display instruction applied to the first target region is detected. The second function icons are different from the first function icons. In particular, at least one of the (Q–L) replaceable function icons is replaced by the displayed second function icons.

In some embodiments, a second target region in the display portion is determined when an expanded display instruction applied to the first target region is detected. The second target region is attached to an edge of the first target region that is adjacent to a center of the display portion. The K second function icons are displayed in the second target region.

It should be understood that, the operations in this embodiment similar to corresponding operations in the above embodiments may be referred to the above embodiments.

The embodiment of the present disclosure also provides a computer-readable medium.

The computer-readable medium stores instructions. The instructions are loaded and executed by the processor to perform the method for displaying icons described in each of the above embodiments.

The embodiments of the present disclosure also provide a computer program product that stores instructions. The instructions are loaded and executed by the processor to perform the method for displaying icons described in each of the above embodiments.

It should be noted that when the device for displaying icons provided in the above embodiments executes the method for displaying icons, the division of the above functional modules is only used as an example for describing. In actual applications, the above functions can be allocated to different functions according to different requirements. In other words, internal structure of the device may be divided into different functional modules to complete all or part of the functions described above. In addition, the device for displaying icons provided by the above-mentioned embodiments belongs to the same concept as the embodiments of the method for displaying icons. For the specific implementation process, as illustrated in the method embodiments, which will not be repeated here.

The serial numbers of the above embodiments of the present disclosure are only for description, and do not represent the advantages and disadvantages of the embodiments.

Those of ordinary skill in the art can understand that all or part of the steps in the above embodiments can be implemented by hardware, or by a program instructing related hardware to complete. The program can be stored in a computer-readable storage medium. The storage medium above-mentioned can be a read-only memory, a magnetic disk or an optical disk, etc.

The above-mentioned embodiments are merely illustrative of several embodiments of the present disclosure, and the description thereof is more specific and detailed, however is not to be construed as limiting the scope of the present disclosure. It should be noted that various variations and modifications may be made by those skilled in the art without departing from the spirit and scope of the present disclosure.

What is claimed is:

1. A method for displaying icons, implemented by a terminal, the method comprising:
   triggering a first target region in response to detecting the terminal is in a horizontal display state or in a vertical display state;
   displaying Q first function icons in the first target region of a display screen of the terminal, wherein the first target region is a display bar adjacent to an edge of the display screen;
   wherein the Q first function icons are selected from P function icons, and the Q first function icons comprise L locked function icons and (Q–L) replaceable function icons, where Q is a preset positive integer, P is an integer greater than Q, and L is an integer smaller than Q.

2. The method of claim 1, further comprising:
   in response to detecting a replacement instruction applied to the first target region, replacing K first function icons, which are selected from the (Q–L) replaceable function icons, with K second function icons selected from (P–Q) second function icons of the P function icons, where K is a positive integer not greater than a smaller one of Q and (P–Q), and K is not greater than (Q–L).

3. The method of claim 2, wherein the first target region comprises at least two sub-regions, and the displaying Q first function icons in the first target region, comprises:
   displaying the (Q–L) replaceable function icons along an arc in a target sub-region and displaying the L locked function icons in other sub-regions, wherein the target sub-region is one of the at least two sub-regions; and
   the method further comprises:
   generating the replacement instruction, in response to detecting a sliding operation performed on the target sub-region along a tangent direction of the arc defined by the first target region.

4. The method of claim 3, wherein the replacing K first function icons, which are selected from the (Q–L) replaceable function icons, with K second function icons selected from (P–Q) second function icons of the P function icons, comprises:
   replacing, in response to detecting a direction of the sliding operation is in a first direction, the (Q–L) replaceable function icons displayed in the target sub-region with K1 second function icons selected from (P–Q) second function icons of the P function icons, and replacing, in response to detecting the direction of the sliding operation is in a second direction, the (Q–L) replaceable function icons displayed in the target sub-region with K2 second function icons selected from the (P–Q) second function icons, while keeping the L locked function icons displayed in the other sub-regions unchanged,
   wherein the second direction is opposite to the first direction, each of K1 and K2 is a positive integer not greater than a smaller one of (P–Q) and (Q–L), a sum of K1 and K2 is not greater than (P–Q), and the K1 second function icons are different from the K2 second function icons.

5. The method of claim 3, wherein the replacing K first function icons, which are selected from the (Q–L) replaceable function icons, with K second function icons selected from (P−Q) second function icons of the P function icons, comprises:
  scrolling K first function icons, which are selected from the (Q−L) replaceable function icons, out of the target sub-region from an end of the target sub-region; and
  scrolling K second function icons selected from the (P−Q) second function icons, into the target sub-region from another end of the target sub-region.

6. The method of claim 3, wherein the replacing K first function icons, which are selected from the (Q−L) replaceable function icons, with K second function icons selected from (P−Q) second function icons of the P function icons, comprises:
  selecting K replaceable function icons from the (Q−L) replaceable function icons, based on a direction of the sliding operation;
  selecting K second function icons from the (P−Q) second function icons, based on the direction of the sliding operation; and
  replacing the selected K replaceable function icons with the selected K second function icons.

7. The method of claim 3, further comprising:
  determining a value of K based on a sliding displacement of the sliding operation; or
  determining a value of K as the smaller one of (P−Q) and (Q−L).

8. The method of claim 2, wherein the displaying Q first function icons in the first target region, comprises:
  displaying the L locked function icons at a center portion of the first target region, and displaying the (Q−L) replaceable function icons at other portions of the first target region; and
  the replacing K first function icons, which are selected from the (Q−L) replaceable function icons, with K second function icons selected from (P−Q) second function icons of the P function icons, comprises:
    scrolling K first function icons, which are selected from the (Q−L) replaceable function icons, out of the first target region from an end of the first target region; and
    scrolling K second function icons of the (P−Q) second function icons, into the first target region from another end of the first target region.

9. The method of claim 2, further comprising: displaying an edge function icon which is one of the (P−Q) second function icons, wherein the edge function icon is divided into a visible portion and a hidden portion by the edge of the display screen, and the visible portion is displayed in the first target region.

10. The method of claim 9, further comprising:
  scrolling the hidden portion into the first target region, in response to detecting a dragging operation from the visible portion toward a center of the display screen.

11. The method of claim 2, further comprising:
  determining first Q function icons of the P function icons as the Q first function icons, and determining (Q+1)th to Pth function icons of the P function icons as the (P−Q) second function icons, based on an order of the P function icons;
  wherein the order is a time sequence in which activation icons of applications are determined as the function icons chronologically, or
  the order is an order of times that the function icons have been involved in history, which is ordering from more to less, or
  the order is a sequence of time intervals between last times that the function icons were involved and a present moment of the terminal, which is ordering from short to long.

12. The method of claim 1, further comprising:
  displaying K second function icons selected from (P−Q) second function icons of the P function icons along an arc around the first target region, in response to detecting an expanded display instruction applied to the first target region,
  wherein the expanded display instruction is generated in response to detecting a sliding operation performed from an edge of the first target region towards the center of the display screen, and K is a positive integer not greater than a smaller one of Q and (P−Q).

13. The method of claim 12, wherein the displaying K second function icons selected from (P−Q) second function icons of the P function icons along an arc around the first target region, comprising:
  determining, as a second target region, a region on the display screen that is attached to an edge of the first target region close to the center of the display screen; and
  displaying the K second function icons in the second target region.

14. The method of claim 13, wherein the first target region comprises at least two sub-regions, and the determining, as a second target region, a region on the display screen that is attached to an edge of the first target region close to the center of the display screen, comprises:
  determining the second target region on the display screen based on an edge of a target sub-region close to the center of the display screen, wherein the target sub-region is one of the at least two sub-regions, and the length of the second target region is equal to the length of the edge of the target sub-region close to the center of the display screen.

15. The method of claim 14, further comprising:
  individually displaying the at least two sub-regions in the display screen in response to a corresponding trigger gesture.

16. The method of claim 13, further comprising:
  cancelling display of the K second function icons in the second target region, in response to detecting a further sliding operation performed from the center of the display screen towards the edge of the first target region away from the center of the display screen.

17. The method as claimed in claim 1, wherein the displaying Q first function icons in the first target region, comprises:
  displaying the Q first function icons along an arc in the first target region, wherein the display bar is an arc-shaped display bar.

18. A terminal, comprising a display screen, a processor and a memory, wherein the memory stores instructions which, when being executed by the processor, cause the processor to perform a method for displaying icons, the method comprising:
  determining a first target display region adjacent to an edge of the display screen;
  displaying Q first function icons in the first target display region, wherein the Q first function icons are selected from P function icons, the Q first function icons comprise L locked function icons and (Q−L) replaceable function icons, where Q is a preset positive integer, and L is an integer smaller than Q;

in response to detecting a replacement instruction applied to the first target display region, replacing K first function icons, which are selected from the (Q−L) replaceable function icons, with K second function icons selected from (P−Q) second function icons of the P function icons, where K is a positive integer not greater than a smaller one of Q and (P−Q), and K is not greater than (Q−L);

wherein before the displaying Q first function icons in the first target display region, the method further comprises:
determining first Q function icons of the P function icons as the Q first function icons, and determining (Q+1)th to Pth function icons of the P function icons as the (P−Q) second function icons, based on an order of the P function icons;
wherein the order is a time sequence in which activation icons of applications are determined as the function icons chronologically, or
the order is an order of times that the function icons have been involved in history, which is ordering from more to less, or
the order is a sequence of time intervals between last times that the function icons were involved and a present moment of the terminal, which is ordering from short to long.

19. The terminal as claimed in claim 18, wherein the displaying Q first function icons in the first target display region, comprises:
displaying the Q first function icons along an arc in the first target display region.

20. A non-transitory storage medium storing instructions thereon, wherein the instructions, when being executed by a processor of a terminal, cause the processor to:
determine a first target display region adjacent to an edge of a display screen of the terminal; and
display Q first function icons in the first target display region, wherein the Q first function icons are selected from P function icons, and the Q first function icons comprise L locked function icons and (Q−L) replaceable function icons, where Q is a preset positive integer, P is an integer greater than Q, and L is an integer smaller than Q;
determine, as a second target region, a region on the display screen that is attached to an edge of the first target display region close to a center of the display screen; and
display K second function icons selected from (P−Q) second function icons of the P function icons in the second target region, in response to detecting an expanded display instruction applied to the first target display region;
wherein the expanded display instruction is generated in response to detecting a sliding operation performed from an edge of the first target region towards the center of the display screen, and K is a positive integer not greater than a smaller one of Q and (P−Q).

* * * * *